May 13, 1958     H. J. ANDERSON ET AL     2,834,258
GEAR CUTTING MACHINE WITH AUTOMATIC LOADER
Filed March 29, 1957     3 Sheets-Sheet 1

INVENTORS
HENRY J. ANDERSON
LEONARD O. CARLSEN
BY Richard W. Treverton
ATTORNEY

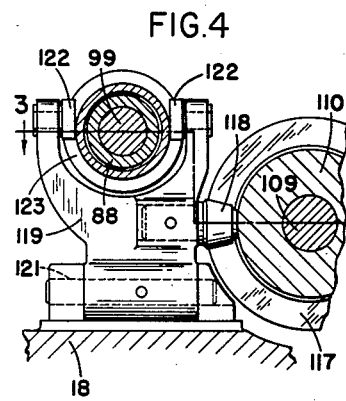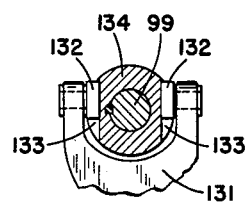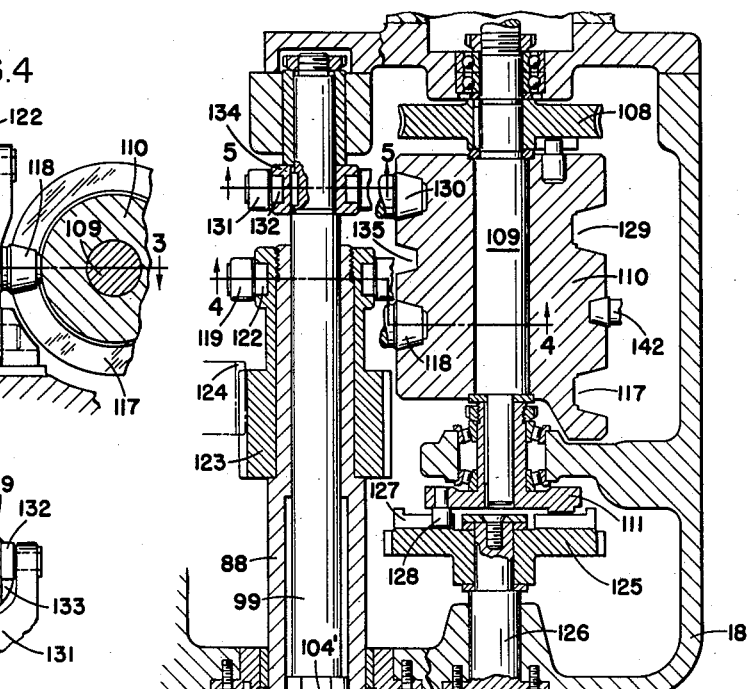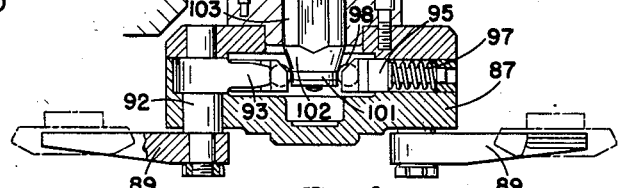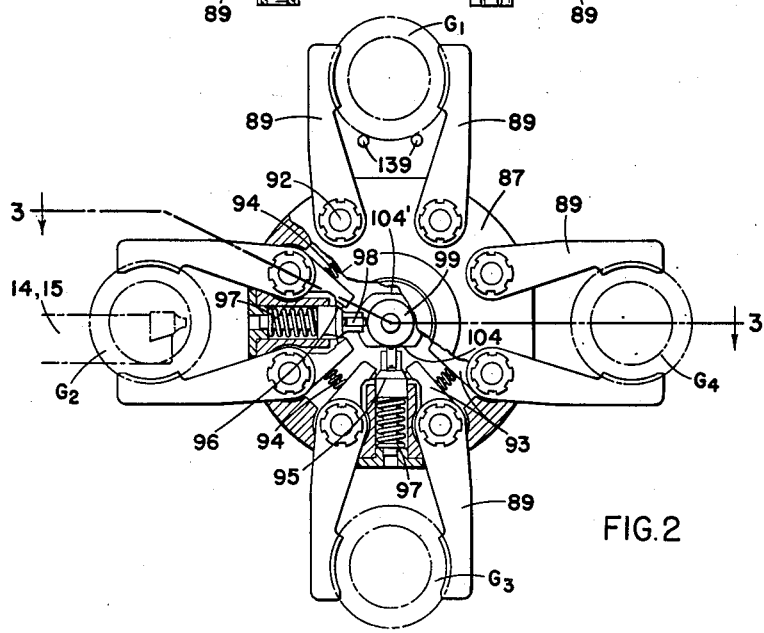

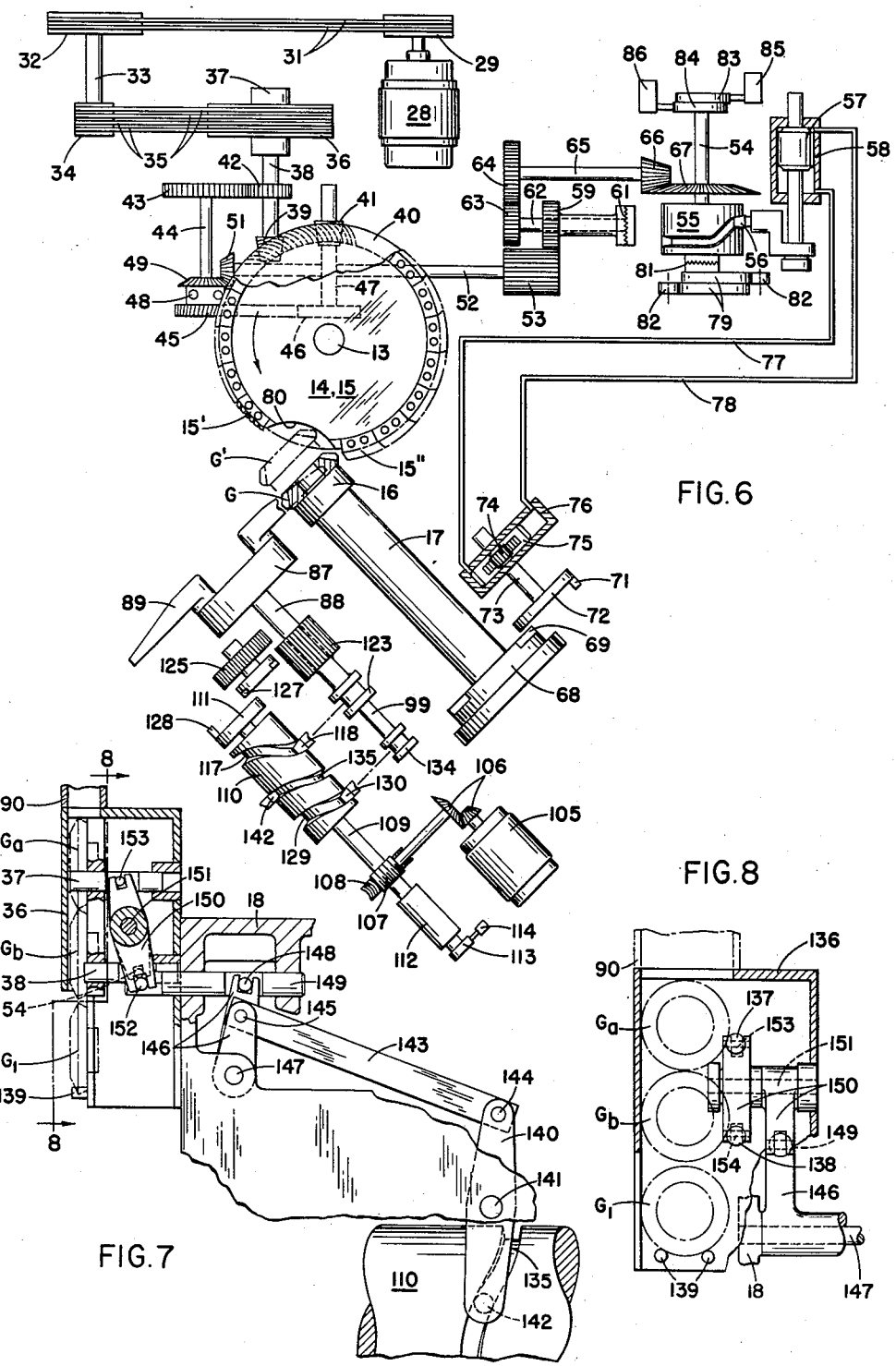

United States Patent Office 2,834,258
Patented May 13, 1958

2,834,258

GEAR CUTTING MACHINE WITH AUTOMATIC LOADER

Henry J. Anderson and Leonard O. Carlsen, Rochester, N. Y., assignors to The Gleason Works, Rochester, N. Y., a corporation of New York Application March 29, 1957, Serial No. 649,396

7 Claims. (Cl. 90—1)

The present invention relates to gear cutting machines of the kind employing a disc cutter adapted upon each revolution to cut one tooth space of a workpiece, and relates especially to the combination with such machine of an improved loader mechanism.

In such a machine the cutter rotates continuously, there being a gap between the last and first cutter blades, and tooth-to-tooth indexing of the workpiece occurs when the gap is abreast of the workpiece. Usually the machine is provided with a loader mechanism comprising a work-gripping arm mounted for swinging motion and also for rectilinear motion upon the work head in which the work spindle of the machine is journaled. In operation the work head is first withdrawn from the cutter to provide room for operation of the loader arm; the arm, gripping a finished workpiece, is moved forwardly to withdraw the workpiece in an axial direction from the spindle and then swung successively to a workpiece discharge station and then to a fresh workpiece receiving station; next the arm is swung to carry a fresh workpiece into alignment with the spindle and then rearwardly, axially of the spindle, to load such workpiece on the spindle; and, finally, the work head is advanced to cutting position.

The object of the present invention is to substantially reduce the loading time, and to thereby increase the productivity of the machine. This is accomplished by providing a workpiece-receiving recess in the cutter disc, adjacent the aforementioned gap in the blades, which enables the loader to withdraw a workpiece axially from the work spindle without first withdrawing the work head from the cutter, and to then rotate to carry the finished workpiece away from the cutting station and simultaneously carry a fresh workpiece into such position in alignment with the work spindle.

A machine according to the invention has a rotary cutter and a work spindle adapted to support a bevel gear workpiece in such position that the periphery of the cutter is substantially tangent to the root of the tooth space to be cut in the workpiece, the cutter comprising a disc having around its periphery a plurality of radial blades with a gap between the last and first blades to permit tooth-to-tooth indexing of the work without cessation of cutter rotation, a loader having a plurality of equi-spaced sets of work-gripping jaws and being rotatable, about an axis parallel to the work spindle and perpendicular to the cutter axis, to cause said sets of jaws to successively carry workpieces to and from a position of alignment with the work spindle, and said loader being reciprocable rearwardly and forwardly along its rotation axis to load the workpiece on the spindle and to unload it from the spindle, respectively, and the cutter disc having a recess in the periphery thereof adjacent said gap and into which the workpiece may extend when the loader is in forward position.

The preferred embodiment of the invention is shown in the accompanying drawings, wherein:

Fig. 2 is a front elevation, with certain parts broken away, of the loader arm and jaw structure, as viewed from plane 2—2 of Fig. 1;

Fig. 3 is a plan sectional view in the planes designated by section lines 3—3 in Figs. 2 and 4;

Fig. 4 is a vertical section in the planes shown by section line 4—4 in Fig. 3.

Fig. 5 is a fragmentary vertical section in plane 5—5 of Fig. 3;

Fig. 6 is a drive diagram of the machine;

Fig. 7 is a detail view, partly in vertical section, of a control means for a workpiece feed chute of the machine; and, Fig. 8 is a detail view in the planes indicated by section line 8—8 of Fig. 7.

Figure 1:
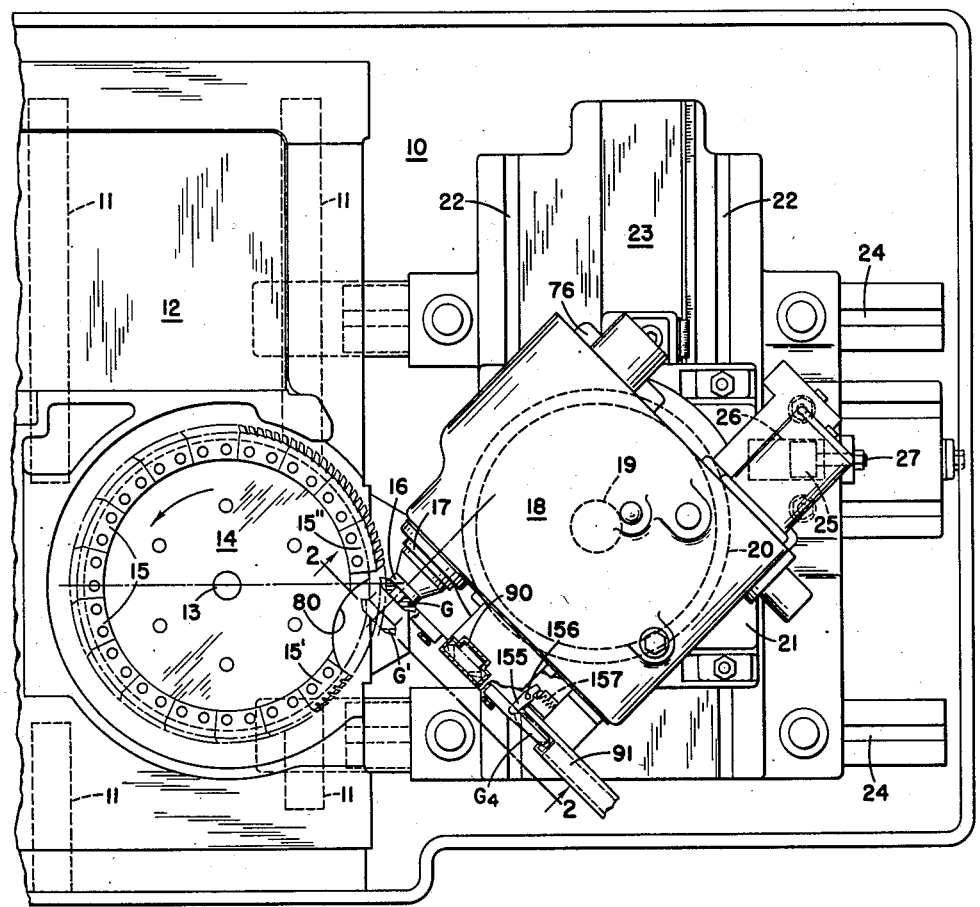
Fig. 1 is a plan view of the machine.

The machine has a frame 10 with horizontal ways 11 upon which a cutter slide 12 is reciprocable. Journaled in this slide is an upright cutter spindle 13 supporting a cutter which comprises a disc 14 having secured about the periphery thereof a plurality of cutter blade segments 15, the first and last of which are designated 15' and 15", respectively. The workpiece which is to have teeth cut therein, in this case the bevel gear G, is mounted on an expansible arbor 16 or other suitable chucking device secured to a work spindle 17. The work spindle is journaled for rotation in a work head 18 which is angularly adjustable upon a center 19 and a circular way 20 on a cross-slide 21. The cross-slide is adjustable along slotted ways 22 in a sliding base 23, parallel to ways 11. The sliding base is movable on the frame 10 along slotted ways 24, in a direction at right angles to ways 11 and 22, such movement being effected by a piston 25 reciprocable in a cylinder 26 secured to the frame. By means of an adjusting screw 27 the sliding base can be adjusted relative to the piston in a direction lengthwise of ways 24.

Referring to Fig. 6, the cutter is driven by a motor 28 mounted on the cutter slide, such drive being through pulley 29, flexible endless belts 31, pulley 32, shaft 33, pulley 34, endless belts 35, pulley 36, magnetic clutch and brake unit 37, shaft 38, hypoid pinion 39 and gear 40 fast on the cutter spindle and driven by pinion 39. For preventing backlash between the gears 39, 40, a spiral bevel pinion 41 runs in mesh with the gear 40 and is driven from shaft 38 through spur gears 42 and 43, shaft 44, and helical gear 45 on shaft 44 and a mating helical gear 46 fixed to the same shaft, 47, to which pinion 41 is secured. Helical gear 45 is not fixed to shaft 44 but is rotatable thereon and is connected thereto by spring means 48 which react against a bevel gear 49 that is secured to the shaft. The effect of spring means 48 is such that, even in the absence of drive loads imposed by motor 28, the drive side of the teeth of gear 40 engages those of pinion 39 under relatively heavy spring pressure while the coast side of the gear teeth engage the teeth of spiral bevel pinion 41 with like spring pressure. The spring means 48 for preventing backlash may be arranged substantially in the manner disclosed in patent application Serial No. 649,434 filed on even date herewith, by L. O. Carlsen.

Bevel gear 49 meshes with a bevel pinion 51 keyed to shaft 52 which also has keyed thereto a wide face spur pinion 53, the latter serving to drive the cutter slide reciprocating means and work spindle indexing means presently to be described. Shafts 33, 38, 44, 47 and 52 are all journaled for rotation in the cutter slide.

Journaled in the frame 10 is a shaft 54 having affixed thereto a drum cam 55 whose follower 56 is connected to a pump piston 57 for reciprocating the same in a cylinder 58. Shaft 54 is driven by pinion 53 through gear 59, fine-tooth face clutch 61, shaft 62, gears 63 and 64, shaft 65, bevel pinion 66 and bevel gear 67. On the work spindle 17 is a driven wheel 68 of a Genevatype indexing mechanism. Wheel 68 has a plurality of radial slots 69 successively engaged by the drive pin 71 of the Geneva mechanism drive wheel 72. The latter is mounted on a shaft 73 to which is affixed a pinion 74 meshing with rack teeth provided on a piston 75 that is reciprocable in a motor cylinder 76 on work head 18. The opposite working chambers of cylinders 58 and 76 are connected by flexible conduits 77 and 78 which, like the cylinders, are filled with hydraulic fluid. The arrangement is such that once during each rotation of the cutter 14, 15, when a gap between the last and first cutter blades (15" and 15') is abreast of the workpiece G, the cam 55 effects a stroke of piston 57, which, by displacement of fluid, results in a stroke of piston 75 and an angular motion of the drive pin 71, to thereby advance the driven member 69, 68. In this way the tooth-to-tooth indexing of the spindle 17 and workpiece G is brought about in time with rotation of the cutter. The indexing arrangement, described here only in outline, preferably is of the kind disclosed in detail in a co-pending patent application, Serial No. 595,254, filed July 2, 1956, by L. O. Carlsen and A. H. Krastel.

A cam 79 is adjustably connected to shaft 54 by a fine tooth clutch 81 and is confined between follower rollers 82 carried by the cutter slide. As shown the cam has separate, complementarily shaped, cam surfaces which respectively engage the two rollers. The arrangement is such that the cam reciprocates the cutter slide back and forth along ways 11 once during each revolution of the cutter. The wide face pinion 53, which reciprocates with the cutter slide, remains in mesh with gear 59 throughout such reciprocation. Cams 83 and 84 on shaft 54 respectively operate switches 85 and 86 controlling a counting device, not shown, and the motor 28 and clutch-brake unit 37 (and also a loader motor, as hereinafter described), so that, upon completion of the number of cycles (cutter revolutions and indexing operations) necessary to cut all the teeth of gear G, the machine will be stopped automatically with the cutter in approximately the position shown.

The loader of the present invention comprises a loader head 87, supported on a tubular shaft 88 that is adapted for rotation and also for axial reciprocation in the work head 18. Pivoted to the head are four identical sets (pairs) of workpiece engaging jaws 89, each set being adapted to receive a workpiece from a feed chute 90, Figs. 1 and 7, at station $G_1$, Fig. 2, and then, upon successive rotational advances, each of 90°, to carry the workpiece to station $G_2$ wherein it is aligned with the work spindle, then to station $G_3$ wherein it may be tested by a suitable device (not shown), and finally to station $G_4$ from which it is ejected into a discharge chute 91, Fig. 1. In order to permit such rotation of the loader with workpieces in the several sets of jaws, without retraction of the work head 18, the periphery of the cutter disc is recessed, as indicated at 80. This recess, which may be regarded as a workpiece receiving recess, is adjacent the gap between the first and last segments of cutter blades, 15' and 15". Viewing the recess as an enlargement of the gap between these blades, it will be seen that the gap thus serves the dual purpose of permitting tooth-to-tooth indexing without cessation of cutter rotation and of permitting loader rotation without withdrawal of the work head.

Each loader jaw 89 is secured to a shaft 92 which is journaled in the loader head 87 and has fixed thereto an arm 93. As shown in Fig. 2, adjacent arms 93 of adjacent sets of jaws are urged apart by a spring 94 disposed between them, the several springs 94 thus combining to urge opening of every set of jaws. For closing the jaws and holding them closed, there is for each set of jaws a plunger 95 having oppositely inclined cam surfaces respectively engaging hardened steel buttons 96 on the two arms 93. Each plunger is backed by a compression spring 97 strong enough to close the jaws against the resistance of the springs 94. For limiting the inward motion of plungers 95, each plunger has on its inner end a roller 98 engaging a jaw actuator rod 99 telescoped within tubular shaft 88. The jaw actuator rod 99 is adapted for axial motion but not for rotation relative to the work head 18. When the rod is positioned, as in Fig. 3, so that its small-diameter portion 101 underlies rollers 98, the springs 97 close the jaws. As the rod shifts to cause the rollers to ride up on conical surface 102 of the rod the plungers 95 are moved radially outwards in the head 87 to open the jaws. And when large-diameter portion 103 of the rod underlies the rollers the jaws are held open. There is an exception in the case of the set of jaws at testing station $G_3$, as shown in Fig. 2 the bottom sides of parts 102 and 103 of rod 99 are cut away to provide a horizontal flat surface 104 so that the set of jaws in this station remains closed in all positions of axial motion of rod 99. A further exception is that a similar but smaller flat 104' may be provided on rod 99 diametrically opposite to flat 104 so that the jaws when in station $G_1$ will open only wide enough to receive a workpiece, i. e. will open to a degree somewhat less than do the jaws in stations $G_2$ and $G_4$.

The loader is operated by a motor 105, Fig. 6, which through reduction gearing comprising bevel gears 106, worm 107 and wormwheel 108, drives loader operating shaft 109. This shaft is journaled in work head 18 and has affixed thereto a driven cam 110, a Geneva index drive wheel 111, a rotary hydraulic valve 112 and a cam 113 for actuating a switch 114 in the control circuits for motors 28 and 105. Cam 110 has a track 117 for a follower roller 118 carried by a shift fork 119, Fig. 4, which is pivoted by pin 121 to the workhead 18. Carried by each branch of the fork is a pivoted bearing block 122 engaged in an annular groove in the hub of a spur gear 123 that is affixed to tubular shaft 88. The shape of cam track 117 is such that once during each revolution of cam 110 the shaft 88 is advanced axially, i. e. shifted downwardly in Fig. 3, and, in Figs. 1 and 6, inclined to the left, to carry the work gear to position G', and then, after a dwell, is withdrawn. When withdrawn the gear 123 meshes with a rack 124 secured to the work head, to hold the loader assembly 87, 88 against rotation, but when advanced the gear disengages the rack and meshes a gear 125. During each dwell of the loader 87, 88 in its advanced position this gear 125 is rotated to angularly advance the loader by 90°. For this purpose the gear 125 is rotatable on a stationary shaft 126 and comprises a Geneva index driven member having radial slots 127 adapted to be periodically engaged by a drive pin 128 on wheel 111. The index device 111, 128, 127 is preferably of the general kind disclosed in Patent 2,625,833, granted to O. A. Johnson on January 30, 1953.

The loader index device and the cam track 117 are in such phase relation that indexing occurs just as soon as the loader head 87 is advanced to its forward limit position and that as soon as indexing is completed the cam track begins the rearward return motion of the loader head.

For actuating the jaw control rod 99, the cam 110 has a track 129 engaged by a follower roller 130 on a pivoted shift fork 131 (similar to fork 119) pivotally supporting bearing blocks 132, Fig. 5. These blocks engage in straight grooves 133 in a collar 134 affixed to rod 99 in a manner to hold the rod 99 against rotation. Cam track 129 is so shaped and is disposed in such phase relation to track 117 that the rod 99 is advanced, to thereby open the loader jaws at the three stations $G_1$, $G_2$ and $G_4$ as soon as the loader head 87 is moved to its rearward limit position by cam track 117; and so that the rod is retracted, to thereby close the loader jaws at these three stations, just prior to advance of the head 87 from such limit position. The cam 113 is so arranged in phase with cam tracks 117 and 129 that as soon as the loader head 87 has been returned to its rear limit position, and the loader jaws are opened, signifying completion of one loader cycle, the switch 114 is actuated by cam 113 to stop motor 105 and start cutter motor 28. Gear cutting then continues until all the teeth have been cut, whereupon the counter controlled by switch 85 and the switch 86 will act to deenergize the motor 28 and energize the brake of unit 37 to stop the cutter 14, 15 in the position shown in Figs. 1 and 6, and to restart the loader motor 105. Thus a loading cycle will automatically follow each cutting cycle, and vice versa. The rotary valve 112 is arranged to control a hydraulic actuator, not shown, which effects expansion and contraction of arbor 16 to cause the arbor to grip or release a workpiece on the arbor. The valve is in such angular relation to cam track 129 that the arbor grips a workpiece just prior to opening of the loader jaws, prior to the tooth cutting operation, and subsequently release the workpiece after the tooth cutting operation just after closing of the jaws.

In cutting workpieces of unusual shape, such as shank-type pinions having very long shanks, the recess 80 may not be large enough to accommodate an axial advance of the workpiece sufficient to free the shank from the chuck on the work spindle. It is then necessary to withdraw the work head 18 from the cutter before the loading function is begun. To enable this, the rotary hydraulic valve 112 may also be connected to cylinder 26 in such manner that, as soon as the motor 105 starts after the completion of a gear cutting operation, the hydraulic pressure will be applied to the piston 25 to cause the piston to withdraw the sliding base 23, and that as soon as the loading function is completed, and before the switch 114 stops the motor 105, the hydraulic pressure will be reversed to cause the piston to advance the sliding base to bring the workpiece on the spindle 17 into position for cutting.

Cam 110 has an additional track, designated 135, for controlling the passage of workpieces through feed chute 90 to station $G_1$. As shown in Figs. 7 and 8, a housing 136 disposed at the bottom of the chute is secured to the work head 18 and has bearings supporting upper and lower stop pins 137 and 138 for axial motion, to respectively arrest workpieces passing through the chute in positions $G_a$ and $G_b$, and a pair of fixed pins 139 to stop and center such workpieces in position $G_1$. The cam track 135 actuates pins 137 and 138 through linkage which includes a lever 140 fulcrumed at 141 on the work head and having a follower roller 142 engaged in the cam track. A pitman 143 is pivoted to the lever 140 at 144 and at 145 to a double arm lever 146. The latter is fulcrumed on the work head at 147 and has a slot-and-pin connection 148 with a pin 149 which is reciprocable in an axial direction in the work head. A double lever 150, which is fulcrumed on the housing 136 by a pintle 151, has a pin-and-slot connection 152 with pin 149 and also has pin-and-slot connections 153 and 154, respectively, with stop pins 137 and 138. The arrangement is such that during each revolution of cam 110 the pin 137 is retracted from the position shown in Fig. 7 and the pin 138 is simultaneously advanced to thereby allow a workpiece to advance by gravity from station $G_a$ to station $G_b$; and then pin 137 is advanced and pin 138 retracted. This retraction of pin 138 allows the workpiece at station $G_b$ to advance to position $G_1$, i. e. against stop pins 139, wherein it is at this time received by loader jaws 89. Pin 137 in its advanced position holds the following workpiece at station $G_a$. The phase relation of cam track 135 to cam track 117 is such that a workpiece drops from station $G_b$ to station $G_1$ as soon as the jaws open after the loader head 87 is moved to its rearward limit position. Thus the workpiece when dropped is confined by the jaws and also by the stop pins 139.

For ejecting workpieces from the loader jaws into discharge chute 91, a lever 155 is pivoted to the work head at 156, and a spring 157 is arranged to urge counterclockwise motion (in Fig. 1) of the lever about its pivot. As the loader head is retracted, i. e. moved in a direction upward and to the right in Fig. 1, the workpiece at station $G_4$ cams the lever clockwise about its pivot 156, thereby compressing spring 157. Upon the subsequent opening of the loader jaws the spring expands to thereby move the lever counterclockwise, ejecting the workpiece into chute 91.

Having now described the preferred embodiment of our invention, and the operation thereof, what we claim is:

1. A gear cutting machine having a rotary cutter and a work spindle adapted to support a bevel gear workpiece in such position that the periphery of the cutter is substantially tangent to the root of the tooth space to be cut in the workpiece, the cutter comprising a disc having around its periphery a plurality of radial blades with a gap between the last and first blades to permit tooth-to-tooth indexing of the work without cessation of cutter rotation, a loader having a plurality of equi-spaced sets of work-gripping jaws and being rotatable, about an axis parallel to the work spindle and perpendicular to the cutter axis, to cause said sets of jaws to successively carry workpieces to and from a position of alignment with the work spindle, and said loader being reciprocable rearwardly and forwardly along its rotation axis to load the workpiece on the spindle and to unload it from the spindle, respectively, and the cutter disc having a recess in the periphery thereof adjacent said gap and into which the workpiece may extend when the loader is in forward position.

2. A gear cutting machine having a rotary cutter and a work spindle adapted to support a bevel gear workpiece in such position that the periphery of the cutter is substantially tangent to the root of the tooth space to be cut in the workpiece, the cutter comprising a disc having around its periphery a plurality of radial blades with a gap between the last and first blades to permit tooth-to-tooth indexing of the work without cessation of cutter rotation, said disc having a recess in the periphery thereof adjacent said gap, a loader having a plurality of circumferentially spaced sets of work gripping jaws arranged therearound, said loader being rotatable to carry workpieces gripped by said sets of jaws to and from a position of alignment with the work spindle and said loader also being reciprocable rearwardly and forwardly along its rotation axis, said recess in said disc receiving each workpiece when the same is aligned with the work spindle and the loader is in the forward position thereof, means for in sequence operating said loader during each cycle thereof to (a) move the loader forwardly to remove a workpiece carried by one set of jaws from the work spindle into a position within said recess, (b) rotate the loader to bring a workpiece carried by another set of jaws into said recess and into alignment with the work spindle, and (c) move the loader rearwardly to load the last-mentioned workpiece onto the work spindle.

3. A machine according to claim 2 in which there is a jaw actuator concentric with said loader, a rotatable cam having a plurality of continuous cam tracks thereon, means engaging and actuated by one of said tracks for effecting axial motion of the loader, means engaging and actuated by another one of said tracks for effecting axial motion of said jaw actuator, and an intermittent motion mechanism operating in time with rotation of said cam for effecting intermittent rotation of the loader.

4. A machine according to claim 2 in which the loader comprises a rotatable and axially movable head supporting said sets of jaws in equi-spaced relation, each set comprising two jaws extending radially outwards from the head and pivoted to the head on axes parallel to the axis of rotation of the head, an arm on each jaw extending radially inwards from the jaw pivot axis, a spring disposed between adjacent arms of adjacent sets for urging opening movement of the jaws, a spring-backed plunger for each set movable radially in the head and engaging both arms of the set for urging closing movement of the jaws, and a jaw actuator concentric with the head and movable axially therein for shifting said plungers outwardly to open the jaws.

5. A machine according to claim 4 comprising a rotatable cam having a plurality of continuous cam tracks thereon, means engaging and actuated by one of said tracks for effecting axial motion of the loader head, means engaging and actuated by another one of said tracks for effecting axial motion of said jaw actuator, and an intermittent motion mechanism operating in time with rotation of said cam for effecting intermittent rotation of the loader head.

6. A machine according to claim 5 in which there is a chute for delivering workpieces to said loader jaws at a station in advance of the work spindle, and means engaging and actuated by still another one of said tracks on the cam for controlling passage of workpieces to said station in timed relationship to axial motion of the loader head.

7. A gear cutting machine comprising a rotatable and axially movable loader head, a plurality of sets of jaws equi-spaced about the head and each comprising two jaws extending radially outwards from the head and pivoted to the head on axes parallel to the axis of rotation of the head, an arm on each jaw extending radially inwards from the jaw pivot axis, a spring disposed between adjacent arms of adjacent sets for urging opening movement of the jaws, a spring-backed plunger for each set movable radially in the head and engaging both arms of the set for urging closing movement of the jaws, and a jaw actuator concentric with the head and movable axially therein for shifting said plungers outwardly to open the jaws.

No references cited.